United States Patent Office 2,730,550
Patented Jan. 10, 1956

---

2,730,550
PRODUCTION AND STABILIZATION OF AROMATIC HYDROPEROXIDES

Jan Pieter Fortuin and Hein Israel Waterman, Delft, Netherlands, assignors to Shell Development Company, Emeryville, Calif., a corporation of Delaware No Drawing. Application March 4, 1952,
Serial No. 274,842

Claims priority, application Netherlands July 5, 1951

18 Claims. (Cl. 260—610)

This invention relates to improvements in the production, processing and storing of aralkylhydroperoxides. The invention relates more particularly to the stabilization of aralkylhydroperoxides under conditions for their production, their processing and their transportation and storage.

Hydroperoxides, to the production and stabilization of which the present invention relates, are obtained by the oxidation of aromatic compounds according to the emperical equation:

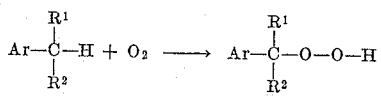

in which Ar represents an aromatic hydrocarbon radical selected from the group consisting of aryl and alkaryl groups and $R^1$ and $R^2$ each represent the same or a different member of the group consisting of any monovalent organic radical, aliphatic, cycloaliphatic, aromatic heterocyclic including hydrocarbon radicals such as alkyl, cycloalkyl, aryl, aralkyl, alkaryl, saturated and unsaturated groups. The radical Ar may be mono- or polynuclear and may be further substituted by minor substituents such as methoxy, ethoxy, radicals. The aromatic hydrocarbons oxidized to obtain the organo hydroperoxides to which the invention relates comprise the alkyl benzene hydrocarbons in which the substituents are one or more alkyl groups, one of which has a tertiary carbon atom attached to the benzene ring. Such alkyl benzene hydrocarbons include, for example, isopropyl benzene, α-methyl-ethyl benzene, p-methyl-isopropyl benzene, p-di-isopropyl benzene, isopropyl naphthalene, their homologues and analogues.

Molecular oxygen, i. e. pure oxygen gas or a mixture of gases comprising oxygen, e. g. air, is generally used as the oxidizing agent, while the aromatic compound to be oxidized is in the liquid state.

The hydroperoxides as just defined may for instance be used as polymerization accelerators, as catalysts in reacting macromolecular compounds, such as rubber with sulphur dioxide as disclosed and claimed in co-pending application Serial No. 113,022 filed August 29, 1949, which matured into U. S. Patent No. 2,558,527 and as intermediates in the manufacture of various products, for instance the corresponding alcohols, but particularly of phenolic compounds as disclosed and claimed in copending application Serial No. 287,493, filed May 13, 1952.

In the specific case wherein the above formula $R^1$ and $R^2$ are both methyl groups and Ar is a phenyl group, the original aromatic compound is cumene, from which cumene hydroperoxide is formed by the oxidation according to the equation

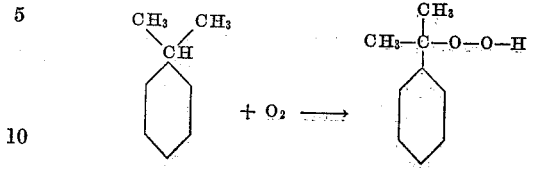

Cumene may be easily prepared by alkylating benzene. This was performed on a large scale during World War II, as cumene was used in motor spirit for aircraft.

Methods of preparing hydroperoxides by oxidation of the above defined aromatic compounds have been disclosed heretofore.

It is generally assumed that free radicals are involved in the reaction mechanism. This may explain why the presence of impurities in the aromatic liquids to be oxidized is often accompanied by an inhibiting effect upon the oxidation reaction. The rate of the reaction may be very low during a longer or shorter "induction period," after which the reaction rate substantially increases.

Various materials have been added to promote the formation of hydroperoxides, either as catalysts or as so-called initiators, which shorten the induction period. Certain compounds of heavy metals have been reported to catalyze the oxidation reaction. More recently, however, it has been reported that the presence of these materials promotes decomposition reactions.

The presence of water has been stated to favor oxidation (H. N. Stephens, J. Am. Chem. Soc. 48 (1926), 2920–2). It has been proposed to disperse or emulsify the aromatic compound in an aqueous continuous phase during oxidation. More recently it was reported that water counteracts the formation of decomposition products, which have an inhibiting effect, but that it has an adverse effect on the rate of the oxidation and promotes decomposition reactions other than those in which inhibitors are formed. A low moisture content, preferably under 60% of saturation, has been recommended.

Irradiation by means of a mercury vapor lamp has been used to promote the reaction. (Heinrich Hock and Shon Lang, Ber. deutsch. Chem. Ges. 77 (1944), 257–64).

According to British patent specification No. 630,286, page 8, lines 13–5, the presence of ozone in the gases containing oxygen has proved to be advantageous. Processes have been described in which aqueous alkaline solutions are in intimate contact with the aromatic compound to be oxidized.

As initiators peroxidic compounds have mainly been employed heretofore. Preferred are the hydroperoxides to be manufactured, since then no additional ingredients will be present in the final reaction mixture. Small proportions of the hydroperoxide may be introduced before oxidation is commenced. Fresh amounts of the aromatic compound to be oxidized may be added during the course of the oxidation to utilize the favorable influence of the hydroperoxide already formed and to reduce the hydroperoxide concentration in the reaction zone thereby decreasing hydroperoxide decomposition.

Finely divided anhydrous sodium carbonate has been stated to act as an initiator, stabilizer, and, perhaps, also as a catalyst, when suspended in cumene to be oxidized to the hydroperoxide.

It has been proposed heretofore, on account of the inhibiting effect of decomposition products and the danger of explosions, to terminate the oxidation when as little as from 20 to 25% of the aromatic compound has been converted to the corresponding hydroperoxide, since decomposition often increases substantially when this concentration is exceeded.

In accordance with the present invention decomposition of organo hydroperoxides is obviated to at least a substantial degree during their production by the oxidation of the corresponding aromatic hydrocarbons, during their processing, and during their transportation and storage by assuring that surfaces of apparatus, equipment, vessels and the like, coming into direct contact with said organo hydroperoxide consist essentially of a metal selected from the group consisting of the members of subgroup I of the periodic table of the elements that is copper, silver and gold, mixtures thereof, and alloys thereof. Surfaces consisting essentially of copper, or alloys thereof, such as brass, red copper alloys, and the like are preferred.

Contrary to that which might be expected from that disclosed heretofore with respect to the behavior of certain metals as initiators for the oxidation reaction while simultaneously promoting decomposition of the reaction products, it has now been found that metals of the subgroup I elements such as, for example, copper and the copper alloys have a marked stabilizing effect upon the organo hydroperoxides when employed under the conditions set forth herein.

The metal surfaces coming into direct contact with the organo hydroperoxides in the apparatus, equipment or vessels employed in accordance with the invention need not be smooth or polished. It is generally preferred to clean the surfaces by means of etching methods such as, for example, aqueous nitric acid. It is to be pointed out that the organo hydroperoxides to which the invention relates do not easily yield oxygen by decomposition in accordance with a more complex reaction mechanism than do such materials as hydroperoxide and many peroxy compounds. The stabilizing effect of the metals defined herein in accordance with the invention could therefore in no wise be foreseen from that which is known of the behavior of metal surfaces in general in the presence of these materials.

When oxidizing aromatic hydrocarbons in accordance with the invention to the corresponding hydroperoxides in equipment or apparatus wherein the surfaces coming into direct contact with organo hydroperoxide-containing mixtures consist essentially of copper, silver or gold, or alloys thereof, oxygen or an oxygen-containing gas is contacted with the aromatic compound to be oxidized; the compound to be oxidized being in the liquid state. Other conditions employed to bring about the desired conversion of the aromatic compounds to the above-identified hydroperoxides comprise those disclosed heretofore.

It is, however, preferred to avoid the presence of water or of aqueous solutions in large proportions with respect to the aromatic compound, the oxidation being preferably performed either under anhydrous conditions or in the presence of such small proportions of water that no substantial formation of a second liquid phase takes place.

Catalysts may be employed. However, these have generally been found to have no appreciable effect when carrying out the oxidation in accordance with the invention. Since in most instances it is necessary to separate the catalyst from the solution obtained after the reaction, which generally incurs complex operative procedures, it is usually preferred not to use catalysts.

Suitable initiators may be employed when executing the process in accordance with the invention. The use as initiators of the same hydroperoxides produced in the process is at times desirable since the final reaction mixture will then comprise no additional components. A minor proportion of previously oxidized aromatic compound may, for example, be added to a fresh aromatic hydrocarbon charge being introduced into the reaction zone.

The charge to the process of the invention may if desired, be subjected to suitable pretreatment. Any one of the methods described in the literature directed to the treatment of the hydrocarbon charge may be resorted to. Suitable methods are for instance: refluxing for eight hours in the presence of metallic sodium followed by fractional distillation; washing with aqueous sodium bisulphite or potassium permanganate solution; distillation with subsequent hydrogenation; treating with sodium hydroxide, and the like.

Atmospheric air is generally preferred as the oxidizing gas because it is cheaper than pure or even commercial oxygen, though it may in some instances be advantageous to use oxygen, because it increases the reaction rate. The oxygen, air, or other oxygen-containing gas, may be humidified or dried, if desired, so as to obtain an advantageous moisture content. When air is used, it may be freed from carbon dioxide. In many instances, atmospheric air may, however, be used as such.

The stabilizing effect of the metallic material constituting surfaces of the reaction vessel walls in direct contact with the reaction mixture in accordance with the invention makes it possible to carry out the oxidation at higher temperatures than usually employed heretofore. In general, temperatures in the range of about 50° C. to the boiling point of the aromatic liquid (i. e. 152° C. for cumene) may be employed, but temperatures above 100° C. are preferred. Best results are, in general, obtained at a temperature of approximately 120° C.

With processes known heretofore decomposition is so serious above 100° C. that the yield of the hydroperoxide is poor. Therefore, a range between 75° C. and 90° C. was generally stated to be most advantageous in such processes. The rate of hydroperoxide formation increases, however, when reaction temperatures are raised. Below 50° C. the reaction is far too slow to enable its use on a practical scale.

In processes disclosed heretofore the reaction time required to obtain a hydroperoxide content of approximately 40 per cent by weight when cumene is oxidized at approximately 90° C. is often approximately 24 hours. As shown hereinbelow substantially the same hydroperoxide content is obtained with considerably shortened reaction time when reaction vessels are employed wherein the wall surfaces in direct contact with the reactants consist essentially of a member of subgroup I of the periodic table of the elements, such as copper.

It has been proposed to increase the pressure to greater than atmospheric in order to make elevation of the temperature during the oxidation to greater than 100° C. possible. It is postulated that increased decomposition of the hydroperoxides is offset by increased formation of the same when the pressure is raised. Though pressures greater than atmospheric pressure may be employed within the scope of the invention, the use of such higher pressures when employing reaction zones wherein the surface in direct contact with the reaction mixture consists essentially of a metal selected from the elements of subgroup I of the periodic table does, in general, not result in any substantial increase of the hydroperoxide yield. It is, therefore, preferred in the process of the present invention to carry out the oxidation at atmospheric pressure since the equipment required is then simpler.

It is very desirable that during the reaction the oxygen-containing gas is brought into intimate contact with the liquid to be oxidized. To this effect means such as, for example, stirrers, nozzles with fine pores, and porous plates may be employed.

It has been proposed to effect good contact between the liquid reactant and the oxidizing gas by forcing the latter through the reaction vessel in such a manner that said vessel is continuously and substantially completely filled with a dispersion of the gas in the liquid. The pressure of the gas at the point of entry is at least one atmosphere gauge. The dispersion of gas and liquid may be discharged into a separator in which gas and liquid phases are separated at substantially atmospheric pressure.

The hydroperoxide content of the reaction mixtures may be determined at regular intervals by analyzing samples, e. g. by means of an iodometric titration. It is, in general, preferred to interrupt the oxidation when a certain not very elevated content has been reached. Though it is possible to go as far as, for instance, 80% by weight, this is not advisable as decomposition of the hydroperoxide formed increases and the rate of hydroperoxide formation decreases as the hydroperoxide content increases. Conversions of, for example, from approximately 40 to 50 per cent by weight may be attained in practice, as hydroperoxide yields are then satisfactory. Best yields are, however, obtained when the conversion is not carried further than to approximately 20% by weight.

The hydroperoxides may be separated from unreacted aromatic hydrocarbon compounds by distillation preferably at reduced pressures. The hydroperoxides themselves may then be purified by separate distillation optionally at lower pressures. A preferred method of recovering the hydroperoxides from the reaction mixture consists, however, in precipitating the sodium salt thereof by means of a concentrated sodium hydroxide solution. The precipitate is then filtered off and decomposed to yield the hydroperoxide by means of an aqueous acid solution. The liquid is extracted with an organic solvent such as benzene and the solvent is finally stripped off. The solution of the hydroperoxide may find use as such.

Although in the foregoing detailed description of the invention the production of cumene hydroperoxide, (alpha, alpha-dimethylbenzylhydroperoxide) by the oxidation of the corresponding aromatic hydrocarbon isopropyl benzene, is stressed. It is to be understood that the invention is in no wise limited in its application to the production of this specific compound but may be applied broadly to the production of organo hydroperoxides, particularly those in which the hydroperoxide group (—O—O—H) is linked to a tertiary aliphatic carbon atom which is directly attached to a nuclear carbon atom in a benzene ring. Examples of the broad class of organo hydroperoxides to the production of which by oxidation of the corresponding aromatic hydrocarbon the invention is applied include:

α-Ethyl-α-methylbenzyl hydroperoxide
α,α-Dimethyl-p-methylbenzyl hydroperoxide
α,α-Dimethyl-p-isopropylbenzyl hydroperoxide
Diphenylmethyl hydroperoxide
α,α-Dimethylnaphthylmethyl hydroperoxide
α,α,α',α',-Tetramethyl-p-xylylene dihydroperoxides
p-Xylyl hydroperoxide
α-Phenylethyl hydroperoxide Similarly, decomposition of the organo-hydroperoxides, including cumene hydroperoxides is obviated to at least a substantial degree during processing, transportation and storage thereof by effecting such processing, transportation and storage in equipment, vessels, containers, drums, or the like, in which all surfaces coming into direct contact with the organo-hydroperoxides consist essentially of a metal selected from subgroup I of the periodic table and mixtures or alloys thereof, preferably copper and copper alloys.

The following examples are illustrative of the stabilization in accordance with the invention of organo-hydroperoxides, under conditions of their production, their processing, their transportation and storage.

*Example I*

20 cc. of 51% by weight solution of cumene hydroperoxide in cumene, obtained by the direct oxidation of cumene, were heated, in each of three test tubes having an inner diameter of 19 mm. consisting of glass, steel and copper respectively, and each provided with a reflux condenser. The tubes were heated in an electrically heated oil bath at 110° C. The hydroperoxide concentration was determined at regular intervals, employing the method described on page 979 of Analytical Chemistry 19 (1947), isopropyl alcohol being used as the solvent for the added excess of sodium iodide. The results, which clearly illustrate the stabilizing effect of the copper, are shown in the following table:

| Number of days elapsed after heating was commenced | Cumene hydroperoxide content (percent by weight) | | |
|---|---|---|---|
| | glass tube | steel tube | copper tube |
| 0 | 51 | 51 | 51 |
| 1 | 38 | 43 | 48 |
| 2 | 27 | 31 | 44 |
| 3 | 15 | 16.5 | 38 |
| 4 | 7 | 7 | 33 |
| 5 | 2.5 | 3 | 27 |
| 6 | 1 | 1 | 21 |

*Example II*

250 cc. of cumene were oxdized, using a 500 cc. red copper vessel which was closed except for an inlet near the bottom and an inlet provided with a reflux condenser at the top. A thermometer and a six-blade red copper stirrer provided with a cork seal were immersed in the liquid. The copper reaction vessel was submerged in an electrically heated oil bath to a level just above that of the liquid contained therein, so that its contents could be maintained at the desired temperature during the reaction.

Commercial grade oxygen was introduced by means of a flow-meter during the reaction at a rate of 25 liters per hour. Oxygen not absorbed by the liquid was discharged to the atmosphere after having passed through the reflux condenser and a flow meter. The amount of oxygen absorbed by the liquid was calculated from the indications of the flow-meters before and after the reaction vessel.

The rate of the oxidation was followed by an hourly analysis of samples, the hydroperoxide being determined iodometrically according to the method described in Analytical Chemistry 19 (1947), 979, using isopropyl alcohol as the solvent for the added sodium iodide. The reaction was interrupted when a hydroperoxide concentration of approximately 45% by weight was estimated to have been reached.

The total oxygen content of the reaction mixtures was then determined by means of the method described by Schutze, Zeitschr. fur Anal. Chemie 118 (1939), 241, and the hydroperoxide content was again determined by means of the same iodometric method as above.

The cumene to be oxidized was a carefully purified technical grade product having a boiling range from 150° C. to 151° C. and $n_D^{20}=1.4912-3$.

Cumene hydroperoxide was used as an initiator, an amount of previously oxidized cumene having been added to the cumene before its introduction into the copper reaction vessel.

The results are shown in the following table which, for comparison, also shows the results obtained with a 500 cc. vessel of a high melting glass (commercially known under the trade name Pyrex) and a bell-shaped stirrer of the same material, other conditions being substantially the same as those of the operation in the copper vessel.

Results obtained when a glass (Pyrex) bell-shaped stirrer was used in the copper vessel under otherwise substantially identical conditions are also shown:

| Material of reaction vessel | Material of Stirrer | Special conditions | Number of revolutions per minute of stirrer | Heating temperature (° C.) | Duration of reaction (hours) | Hydroperoxide concentration (percent by weight) | | Total oxygen content (percent by weight) of reaction Mixture | Yield with respect to oxygen absorbed (percent) | Increase Hydroperoxide content (percent by weight per hour) |
|---|---|---|---|---|---|---|---|---|---|---|
| | | | | | | original charge | final reaction mixture | | | |
| Glass (Pyrex) | Glass (Pyrex) | | 880 | 120 | 7½ | 3.0 | 46.5 | 12.5 | 78 | 5.6 |
| Copper | Glass | | 880 | 120 | 6 | 3.0 | 56.2 | 14.0 | 84.3 | 8.9 |
| Do | Copper | | 880 | 120 | 4 | 3.6 | 45.1 | 11.1 | 85.6 | 10.4 |
| Do | do | oxygen humidified. | 880 | 120 | 4 | 3.6 | 39.1 | 9.2 | 89.4 | 8.9 |
| Do | do | | 880 | 130 | 3 | 3.6 | 44.3 | 11.2 | 83.3 | 13.5 |
| Do | do | | 2,000 | 130 | 2¼ | 3.6 | 42.6 | 11.1 | 81.0 | 17.2 |
| Do | do | 0.1% by weight of zinc stearate added as a catalyst. | 880 | 120 | 2 | 3.6 | 15.4 | 3.6 | 90.0 | 5.9 |

*Example III*

225 milliliters of carefully purified technical grade cumene were each time oxidized in the same copper apparatus with copper stirrer as described in Example II. The oxygen flow was 25 liters per hours. No initiator was added.

The total oxygen content of the liquid was determined indirectly in conjunction with an ultimate analysis in which carbon and hydrogen were determined.

The hydroperoxide content was determined by means of the same iodometrical method as that used in the previous examples. The yield with respect to the total amount of oxygen absorbed was computed as the proportion between the oxygen bound in the hydroperoxide and the total oxygen content.

Results were as follows:

| Temperature (° C.) | Duration of reaction (hours) | Final hydroperoxide concentration (percent by weight) | Total oxygen content (percent by weight) | Yield with respect to absorbed oxygen (percent) |
|---|---|---|---|---|
| 120 | 1 | 11.0 | 2.45 | 95 |
| 120 | 2 | 22.5 | 5.08 | 93 |
| 120 | 3 | 34.7 | 7.54 | 96 |
| 130 | 1 | 25.0 | 6.50 | 81 |

It is clearly shown that a very good yield is obtained at a temperature as high as 120° C., and that at 130° C. the yield is somewhat less though still satisfactory.

*Example IV*

Di-isopropyl benzene obtained as residue in distillations of technical grade cumene, was carefully purified and fractionated. 250 grams of the fraction having a boiling range from 205° C. to 210° C. was oxidized, using the same glass and copper reaction vessels and substantially the same conditions as described in Example II.

No initiator was added. The total oxygen content was not determined. Stirring was invariably performed at a rate of 880 revolutions per hour. No catalyst was added. Results are shown in the following table.

| Material of reaction vessel and of stirrer | Rate at which oxygen gas was introduced (liter/hr.) | Heating temperatures (° C.) | Duration of reaction (hours) | Final hydroperoxide concentration (percent by weight) | Increase in hydroperoxide content (percent by weight per hour) |
|---|---|---|---|---|---|
| Glass (Pyrex) | 9 | 120 | 7½ | 10.3 | 1.3 |
| Copper | 25 | 120 | 6 | 17.7 | 2.9 |

*Example V*

Technical grade p-cymene was carefully purified and fractionated. The fraction with a boiling range from 176.4 to 176.8° C. was oxidized, using the same copper apparatus as in the Examples II and III. The amount of liquid was 225 milliliters. The oxygen flow was again 25 liters per hour. No initiator was added.

The total oxygen content of the liquid was indirectly determined in conjunction with ultimate analysis in which carbon and hydrogen were determined.

The hydroperoxide content was determined by means of the same iodometrical method as in the previous examples. The yield with respect to the total amount of oxygen absorbed was computed as the proportion between the oxygen bound in the hydroperoxide and the total oxygen content.

Results were as follows:

| Temperature (° C.) | Duration of reaction (hours) | Final hydroperoxide concentration (percent by weight) | Total oxygen content (percent by weight) | Yield with respect to absorbed oxygen (percent) |
|---|---|---|---|---|
| 120 | 6 | 5.8 | 1.57 | 71 |

The invention claimed is:

1. In a process for the production of an $\alpha,\alpha$-dialkyl aralkyl hydroperoxide-containing reaction mixture by the reaction of an $\alpha,\alpha$-dialkyl aralkyl hydrocarbon with an oxygen-containing gas in a reaction zone, the improvement which comprises employing as said reaction zone a zone wherein all wall-surfaces of said reaction zone coming into direct contact with said reaction mixture consist essentially of a metal selected from the group consisting of copper, silver, gold and alloys thereof, thereby reacting said $\alpha,\alpha$-dialkyl aralkyl hydrocarbon with said oxygen-containing gas in the absence of any substantial decomposition of $\alpha,\alpha$-dialkyl aralkyl hydroperoxide in said reaction zone.

2. The process in accordance with claim 1 wherein said $\alpha,\alpha$-dialkyl aralkyl hydroperoxide is $\alpha,\alpha$-dialkyl phenylalkyl hydroperoxide and said $\alpha,\alpha$-dialkyl aralkyl hydrocarbon is a $\alpha,\alpha$-dialkyl-substituted alkyl benzene.

3. In a process for the production of an aryl(dialkyl)-methyl hydroperoxide-containing reaction mixture by the reaction of an aryl(dialkyl)methane with an oxygen-containing gas in a reaction zone, the improvement which comprises employing as said reaction zone, a zone wherein all wall-surfaces of said reaction zone coming in direct contact with said reaction mixture consists essentially of a metal selected from the group consisting of copper, silver, gold and alloys thereof, thereby reacting said aryl-(dialkyl)methane with said oxygen-containing gas in the absence of any substantial decomposition of an aryl(dialkyl)methyl hydroperoxide in said reaction zone.

4. The process in accordance with claim 3 wherein said aryl(dialkyl)methyl hydroperoxide is $\alpha,\alpha$-dialkylbenzyl hydroperoxide and said aryl(dialkyl)methane is an $\alpha,\alpha$-dialkyl methylbenzene.

5. The process in accordance with claim 3 wherein said aryl(dialkyl)methyl hydroperoxide is $\alpha,\alpha$-dimethylbenzyl hydroperoxide and said aryl(dialkyl)methane is isopropylbenzene.

6. In a process for the production of an $\alpha,\alpha$-dialkyl phenylalkyl hydroperoxide-containing reaction mixture by the interaction of an $\alpha,\alpha$-dialkyl-substituted alkylbenzene with an oxygen-containing gas in a reaction zone which comprises employing as said reaction zone a zone wherein all wall-surfaces coming into direct contact with said reaction mixture consists essentially of copper, thereby reacting said $\alpha,\alpha$-dialkyl-substituted alkylbenzene with said oxygen-containing gas in the absence of any substantial $\alpha,\alpha$-dialkyl phenylakyl hydroperoxide decomposition.

7. The process in accordance with claim 6 wherein said $\alpha,\alpha$-dialkyl phenylalkyl hydroperoxide is $\alpha,\alpha$-dialkylbenzyl hydroperoxide and said $\alpha,\alpha$-dialkyl-substituted alkylbenzene is an $\alpha,\alpha$-dialkyl methylbenzene.

8. The process in accordance with claim 7 wherein said $\alpha,\alpha$-dialkyl phenylalkyl hydroperoxide is $\alpha,\alpha$-dimethylbenzyl hydroperoxide and said $\alpha,\alpha$-dialkyl-substituted alkylbenzene is isopropylbenzene.

9. The process for the production of $\alpha,\alpha$-dimethylbenzyl hydroperoxide-containing reaction mixtures which comprises reacting isopropylbenzene with an oxygen-containing gas at a temperature of about 100 to about 152° C. in a reaction zone wherein all surfaces of said reaction zone coming into direct contact with said reaction mixtures consist essentially of a metal selected from the group consisting of copper, silver, gold and alloys thereof, thereby reacting said isopropylbenzene with said oxygen-containing gas in the absence of any substantial decomposition of $\alpha,\alpha$-dimethylbenzyl hydroperoxide.

10. The process for the production of $\alpha,\alpha$-dimethylbenzyl hydroperoxide-containing reaction mixtures which comprises reacting isopropylbenzene with an oxygen-containing gas at a temperature in the range of from about 100 to about 152° C. in a reaction zone wherein all surfaces of said reaction zone coming into direct contact with said reaction mixtures consist essentially of copper, thereby reacting isopropylbenzene with said oxygen-containing gas in the absence of any substantial decomposition of said $\alpha,\alpha$-dimethylbenzyl hydroperoxide.

11. The process for the production of $\alpha,\alpha$-dimethyl-p-isopropylbenzyl hydroperoxide which comprises reacting p-isopropyltoluene with an oxygen-containing gas at a temperature of about 100 to about 152° C. in a reaction zone wherein all surfaces of said reaction zone consist essentially of copper, thereby reacting p-isopropyltoluene with said oxygen-containing gas in the absence of any substantial decomposition of said $\alpha,\alpha$-dimethyl-isopropylbenzyl hydroperoxide.

12. The method of suppressing the substantial decomposition of $\alpha,\alpha$-(dialkyl)aralkyl hydroperoxide while subjected to conditions of its production, processing, transportation and storage which comprises subjecting said $\alpha,\alpha$-(dialkyl)aralkyl hydroperoxide to said conditions while enclosed in a confined space wherein all surfaces of the walls defining said confined space coming into direct contact with said $\alpha,\alpha$-(dialkyl)aralkyl hydroperoxide consist essentially of a metal of the group consisting of copper, silver, gold and alloys thereof.

13. The method in accordance with claim 12 wherein said metal is copper.

14. The method in accordance with claim 12 wherein said $\alpha,\alpha$-(dialkyl)aralkyl hydroperoxide is aryl(dialkyl)-methyl hydroperoxide.

15. The method of inhibiting to at least a substantial degree the decomposition of an $\alpha,\alpha$-dialkyl phenylalkyl hydroperoxide while confined in a vessel subjected to temperature conditions encountered in the production, transportation and storage of said $\alpha,\alpha$-dialkyl phenylalkyl hydroperoxide which comprises employing as said vessel a vessel wherein all wall-surfaces coming into direct contact with said $\alpha,\alpha$-dialkyl phenylalkyl hydroperoxide consist essentially of copper.

16. The method in accordance with claim 15 wherein said $\alpha,\alpha$-dialkyl phenylalkyl hydroperoxide is an $\alpha,\alpha$-dialkylbenzyl hydroperoxide.

17. The method in accordance with claim 15 wherein said $\alpha,\alpha$-dialkyl phenylalkyl hydroperoxide is $\alpha,\alpha$-dimethylbenzyl hydroperoxide.

18. The method of inhibiting the decomposition of $\alpha,\alpha$-dimethylbenzyl hydroperoxide at temperatures in the range of from about 100 to about 152° C. which comprises maintaining said $\alpha,\alpha$-dimethylbenzyl hydroperoxide in a confined space wherein all surfaces defining the walls of said confined space coming into direct contact with said $\alpha,\alpha$-dimethylbenzyl hydroperoxide consist essentially of copper while subjected to said temperatures.

References Cited in the file of this patent

UNITED STATES PATENTS

| 2,559,630 | Bullitt | July 10, 1951 |
| 2,564,024 | Miller | Aug. 14, 1951 |

OTHER REFERENCES

Kreulen: Jour. Institute Petroleum, vol. 38 (1952), page 449.